(12) United States Patent
Sun et al.

(10) Patent No.: US 10,273,401 B2
(45) Date of Patent: Apr. 30, 2019

(54) HYDRAULIC FRACTURING USING SUPER ABSORBENT POLYMER HAVING CONTROLLED PARTICLE SIZE

(71) Applicants: Hong Sun, Houston, TX (US); Paul S. Carman, Spring, TX (US); Alyssa Michelle Volk, Tomball, TX (US); Johnny Chapman, Cypress, TX (US)

(72) Inventors: Hong Sun, Houston, TX (US); Paul S. Carman, Spring, TX (US); Alyssa Michelle Volk, Tomball, TX (US); Johnny Chapman, Cypress, TX (US)

(73) Assignee: BAKER HUGHES, A GE COMPNAY, LLC, Houston, TX (US)

( * ) Notice: Subject to any disclaimer, the term of this patent is extended or adjusted under 35 U.S.C. 154(b) by 21 days.

(21) Appl. No.: 15/398,120

(22) Filed: Jan. 4, 2017

(65) Prior Publication Data
US 2017/0190957 A1    Jul. 6, 2017

Related U.S. Application Data

(60) Provisional application No. 62/274,930, filed on Jan. 5, 2016.

(51) Int. Cl.
   *C09K 8/80*    (2006.01)
   *C09K 8/68*    (2006.01)

(52) U.S. Cl.
   CPC .......... *C09K 8/685* (2013.01); *C09K 8/80* (2013.01)

(58) Field of Classification Search
   CPC ........ E21B 43/26; E21B 43/04; E21B 33/138; E21B 33/134; E21B 21/00; E21B 37/06; E21B 43/14; E21B 21/003; E21B 43/16; E21B 34/06; E21B 36/003; E21B 21/062; E21B 33/068; E21B 33/124; E21B 34/14; E21B 23/08; E21B 33/12; E21B 33/16; E21B 34/063; E21B 43/006; E21B 43/116; E21B 47/06; C09K 8/62; C09K 8/80; C09K 8/68; C09K 8/035; C09K 8/70; C09K 8/12; C09K 8/52; C09K 8/34; C09K 8/528; C09K 8/76; C09K 8/50; C09K 8/508; C09K 8/516; C09K 8/64; C09K 8/92; C09K 8/32; C09K 8/40; C09K 8/512; C09K 8/514; C09K 8/536; C09K 8/04; C09K 8/426; C09K 8/487; C09K 8/588
   See application file for complete search history.

(56) References Cited

U.S. PATENT DOCUMENTS

| | | | |
|---|---|---|---|
| 2008/0085843 A1 | 4/2008 | Wang et al. | |
| 2009/0281006 A1* | 11/2009 | Walters | C09K 8/68 507/270 |
| 2012/0168157 A1* | 7/2012 | DiTommaso | C02F 1/048 166/267 |
| 2013/0056213 A1 | 3/2013 | Medvedev et al. | |
| 2014/0060832 A1 | 3/2014 | Mahoney et al. | |
| 2014/0332213 A1 | 11/2014 | Zhou et al. | |
| 2014/0332214 A1* | 11/2014 | Zhou | E21B 43/267 166/280.2 |
| 2015/0096751 A1* | 4/2015 | Shen | C09K 8/685 166/280.2 |

OTHER PUBLICATIONS

"Hydraulic Fracturing: An Environmentally Responsible Technology for Ensuring Our Energy Future", Baker Hughes Incorporated (2012); 10 pages.
International Search Report, International Application No. PCT/US2017/012244, dated Apr. 24, 2017, Korean Intellectual Property Office; International Search Report 4 pages.
International Written Opinion, International Application No. PCT/US2017/012244, dated Apr. 24, 2017, Korean Intellectual Property Office; International Written Opinion 10 pages.
Yang, et al. "Supramolecular Fluid of Associative Polymer and Viscoelastic Surfactant for Hydraulic Fracturing", Society of Petroleum Engineers (2016) 7 pages.

* cited by examiner

*Primary Examiner* — Kumar R Bhushan
(74) *Attorney, Agent, or Firm* — Cantor Colburn LLP

(57) ABSTRACT

A hydraulic fracturing process comprises combining an aqueous carrier with a superabsorbent polymer and a plurality of proppant particles to form a fracturing fluid; and disposing the fracturing fluid in a downhole environment. When the aqueous carrier has a total dissolved solid content of equal to or less than 400 parts per million and a hardness of less than 100 parts per million as calcium carbonate, the superabsorbent polymer comprises particles having a size of about 145 microns to about 600 microns. When the aqueous carrier has a total dissolved solid content of greater than 400 parts per million to less than 8,000 parts per million and a hardness of greater than 100 parts per million to less than 2,500 parts per million as calcium carbonate, the superabsorbent polymer comprises particles having a size of about 145 microns to about 300 microns.

17 Claims, 3 Drawing Sheets

HYDRAULIC FRACTURING USING SUPER ABSORBENT POLYMER HAVING CONTROLLED PARTICLE SIZE

CROSS-REFERENCE TO RELATED APPLICATIONS

The present application claims priority from U.S. Provisional Patent Application No. 62/274,930, filed Jan. 5, 2016. The contents of the priority application are hereby incorporated by reference in their entirety.

BACKGROUND

Hydraulic fracturing increases the flow of desirable fluids such as oil and gas from a subterranean formation and involves placing a fracturing fluid into a subterranean formation or zone at a rate and pressure sufficient to impart a stress in the formation or zone with attendant production of a fracture in the formation or zone.

Beyond creating the fracture, the fracturing fluid also transports a proppant into the fracture. The proppant keeps the fracture open after release of the exerted pressure. Further, the proppant establishes conductive channels in which the desirable fluids flow to the borehole. Since the proppant provides a higher conductivity than the surrounding rock, the fracture has greater potential for production of hydrocarbons.

Some fracturing fluids contain absorbent materials to carry proppant. To carry large amounts of proppant, the loading of the absorbent materials has to reach a certain level in order to minimize phase separation or settling of proppant before the fracture closes. In practice, it is always desirable to use minimal absorbent materials to allow for easier and more complete degradation or "break" to leave less formation or proppant pack damage and to reduce cost. Accordingly, methods that improve the efficiency of fracturing fluids are well received by the industry.

BRIEF DESCRIPTION

In an embodiment, a hydraulic fracturing process comprises combining an aqueous carrier with a superabsorbent polymer and a plurality of proppant particles to form a fracturing fluid; the aqueous carrier having a total dissolved solid content of equal to or less than 400 parts per million and a hardness of less than 100 parts per million as calcium carbonate; and the superabsorbent polymer comprising particles having a size of about 145 microns to about 600 microns; and disposing the fracturing fluid in a downhole environment.

In another embodiment, a hydraulic fracturing process comprises: combining an aqueous carrier with a superabsorbent polymer and a plurality of proppant particles to form a fracturing fluid; the aqueous carrier having a total dissolved solid content of greater than 400 parts per million to less than 8,000 parts per million and a hardness of greater than 100 parts per million to less than 2,500 parts per million as calcium carbonate; and the superabsorbent polymer comprising particles having a size of about 145 microns to about 300 microns; and disposing the fracturing fluid in a downhole environment.

A method of improving the efficiency of a superabsorbent polymer to carry proppants in a fracturing fluid comprises: providing a superabsorbent polymer, wherein greater than about 85 wt % of the superabsorbent polymer has a particle size of about 145 microns to about 600 microns based on the total weight of the superabsorbent polymer; and combining the superabsorbent polymer with an aqueous carrier and a plurality of proppant particles; the aqueous carrier having a total dissolved solid content of equal to or less than 400 parts per million and a hardness of less than 100 parts per million as calcium carbonate.

A method of improving the efficiency of a superabsorbent polymer to carry proppants in a fracturing fluid comprises providing a superabsorbent polymer, wherein greater than about 85 wt % of the superabsorbent polymer has a particle size of about 145 microns to about 300 microns based on the total weight of the superabsorbent polymer; and combining the superabsorbent polymer with an aqueous carrier and a plurality of proppant particles; the aqueous fluid having a total dissolved solid content of greater than 400 parts per million to less than 8,000 parts per million and a hardness of greater than 100 parts per million to less than 2,500 parts per million as calcium carbonate.

A hydraulic fracturing fluid comprises an aqueous carrier having a total dissolved solid content of equal to or less than 400 parts per million and a hardness of less than 100 parts per million as calcium carbonate; a superabsorbent polymer; wherein greater than about 85 wt % of the superabsorbent polymer has a particle size of about 145 microns to about 600 microns; and a plurality of proppant particles.

A hydraulic fracturing fluid comprises an aqueous carrier having a total dissolved solid content of greater than 400 parts per million to less than 8,000 parts per million and a hardness of greater than 100 parts per million to less than 2,500 parts per million as calcium carbonate; a superabsorbent polymer; wherein greater than about 85% of the superabsorbent polymer has a particle size of about 145 microns to about 300 microns based on the total weight of the superabsorbent polymer; and a plurality of proppant particles.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
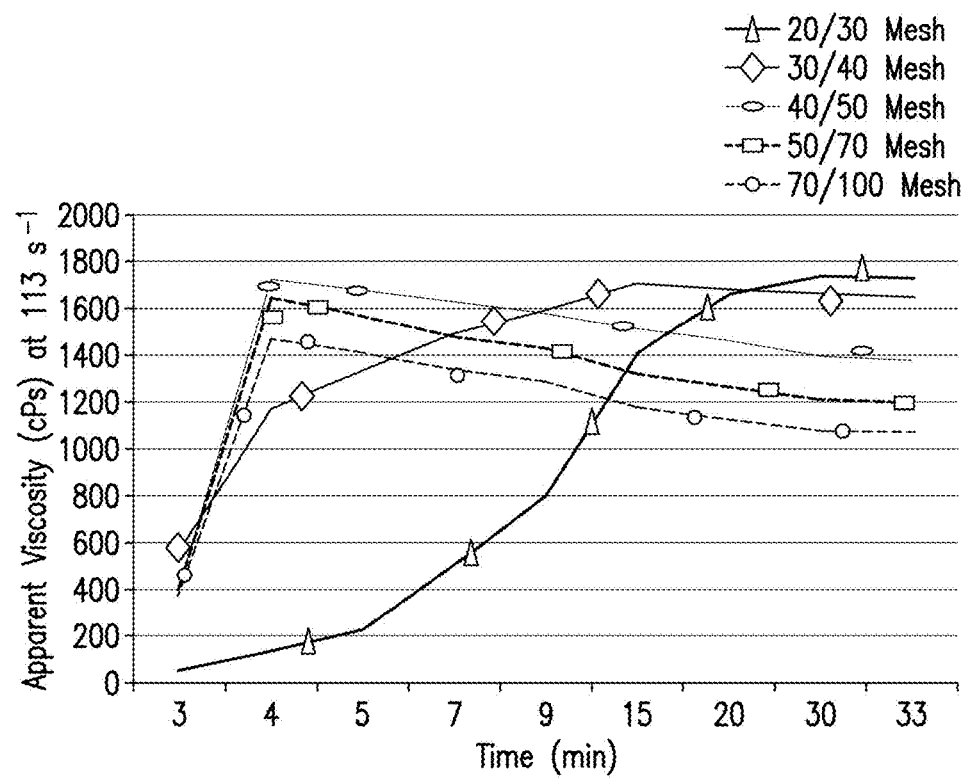
FIG. 1 shows the viscosity changes of compositions containing fresh water and a superabsorbent polymer having different particle size ranges.

The inventors hereof have found that there is a correlation between the particle size of superabsorbent polymers and the efficiency of fracturing fluids. The inventors have also found that the optimal particle size can vary depending on the quality of the aqueous carrier used in a fracturing fluid.

In particular, it has been discovered that when superabsorbent polymers comprise particles having a size of about 145 microns to about 600 microns for fresh aqueous carrier applications or a size of about 145 microns to about 300 microns for lower quality aqueous carrier applications, the superabsorbent polymers swell quickly and completely within the timeframe of fracturing treatment. The improved efficiency allows for the use of less absorbent polymers to provide desirable proppant suspension and transportation. Using less superabsorbent polymers lowers overall fluid cost. In addition, using less superabsorbent polymers provides less amount of polymer residues after breaking, which can lead to less formation damage.

As used herein, a "fresh aqueous carrier" refers to an aqueous carrier having a total dissolved solid content of equal to or less than 400 parts per million and a hardness of less than 100 parts per million based on calcium carbonate; and a "lower quality aqueous carrier" refers to an aqueous carrier having a total dissolved solid content of greater than 400 parts per million to less than 8,000 parts per million and a hardness of greater than 100 parts per million to less than 2,500 parts per million based on calcium carbonate.

Total dissolved solids (TDS) are solids in an aqueous carrier that can pass through a filter having a pore size of 2 microns. TDS is a measure of the amount of material dissolved in water. This material can include carbonate, bicarbonate, chloride, sulfate, phosphate, nitrate, calcium, magnesium, sodium, organic ions, or other ions.

To measure TDS, an aqueous sample is filtered, and then the filtrate is evaporated in a pre-weighed dish and dried in an oven at 180° C., until the weight of the dish no longer changes. The increase in weight of the dish represents the total dissolved solids.

As used herein, hardness is the concentration of divalent cations including calcium, magnesium and strontium ions expressed as equivalent of calcium carbonate. The hardness is determined by measuring the level of divalent cations including calcium, magnesium and strontium ions (mg/L or ppm, which can be converted to mmol/L by dividing the concentration in mmol/L or ppm by atomic weights of the corresponding cations.) in the aqueous carrier and then converting the amount of the divalent cations to the amount of calcium carbonate according to the following: 100× divalent cation concentration (mmol/L).

The superabsorbent polymer is a crosslinked polymer that is capable of absorbing large amounts of aqueous liquids, such as water, brine, acid, or base, with swelling and the formation of a gel or viscous material, and retains the absorbed fluid under a certain pressure or temperature. The superabsorbent polymer has internal crosslinks, surface crosslinks, or a combination thereof. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

In an embodiment, the SAP has a hydrophilic network that retains large amounts of aqueous liquid relative to the weight of the SAP. Non-limiting examples of such SAPs are a polysaccharide material (that, e.g., in a dry state, absorbs and retains a weight amount of water equal to or greater than its own weight), poly 2-hydroxyethyl acrylate, polyalkyl acrylate, polyacrylamide, poly methacrylamide, poly vinylpyrrolidone, and poly vinyl acetate. As a specific example, the SAP is a copolymer of acrylamide with, for example, maleic anhydride, vinyl acetate, ethylene oxide, ethylene glycol, acrylonitrile, or a combination thereof. Production of SAPs are, e.g., from acrylamide (AM) or acrylic acid and its salts.

In an embodiment, the SAP includes a guar gum and carrageenan. The guar gum used in the SAP includes natural guar gum as well as enzyme treated guar gum; the latter having been obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, and the like. In addition, in an embodiment, a natural polysaccharide, other than guar and carrageenan, is included. Exemplary natural polysaccharides include starch, cellulose, xanthan gum, agar, pectin, alginic acid, tragacanth gum, pluran, gellan gum, tamarind seed gum, cardlan, gum arabic, glucomannan, chitin, chitosan, hyaluronic acid, and the like.

Carrageenan is an ionic linear polysaccharide that includes repeating galactose units that individually may be sulfated or unsulfated. Specific carrageenan types include kappa, iota, lambda, and the like. In some embodiments, a mixture of carrageenan types is used. In a specific embodiment, a carrageenan or a carrageenan-like material that form a gel is used. In addition to natural carrageenan, suitable carrageenans include enzyme-treated substances of natural carrageenan or derivatized carrageenan, e.g., those prepared by treating natural carrageenan (e.g., with a chemical) to introduce a functional group (e.g., a carboxyl group, hydroxyl alkyl group, sulfate group, phosphate group, and the like).

The SAP includes a plurality of crosslinks among the polymer chains of the SAP. According to an embodiment, the crosslinks are covalent and result from crosslinking within the SAP. In an embodiment, the crosslinker is an ethylenically unsaturated monomer that contains, e.g., two sites of ethylenic unsaturation (i.e., two ethylenically unsaturated double bonds), an ethylenically unsaturated double bond and a functional group that is reactive toward a functional group (e.g., an amide group) of the polymer chains of the SAP, or several functional groups that are reactive toward functional groups of the polymer chains of the SAP. In an embodiment, the degree of crosslinking in the SAP herein is selected to control the amount of swelling (i.e., fluid absorption or volume expansion) of the SAP. Exemplary crosslinks are described in US 2014/0332213, US 2014/0332214, and US 2015/0096751.

In an embodiment, the SAP is a particle (or fiber or other format) that includes surface crosslinks, which occur external to the interior of the SAP. The surface crosslinks, e.g., result from addition of a surface crosslinker to the SAP particle and heat-treatment. The surface crosslinks increase the crosslink density of the SAP near its surface with respect to the crosslinking density of the interior of the SAP. Some surface crosslinkers have a functional group that is reactive toward a group of the polymer chains of the SAP, e.g., an acid or amide group. The surface crosslinker are one of the previously mentioned crosslinkers and include a functional group such as an alcohol, amine, aldehyde, or carboxylate group. In an embodiment, surface crosslinkers have multiple different functional groups such as polyols, polyamines, polyaminoalcohols, and alkylene carbonates. The surface crosslinkers also provide the SAP with a chemical property that the polymer chains of the SAP did not have before surface crosslinking and control chemical properties of the SAP, e.g., hydrophobicity, hydrophilicity, or adhesiveness of the SAP to other materials such as minerals (e.g., silicates) or other chemicals such as petroleum compounds (e.g., hydrocarbons, asphaltene, and the like). Preferably the internal and external crosslinks are formed before the SAP is combined with the aqueous carrier and the proppant particles.

In an embodiment, the SAP includes a repeat unit that comprises an acrylate, an acrylamide, a vinylpyrrolidone, a vinyl ester (e.g., a vinyl acetate), a vinyl alcohol, a saccharide, a 2-acrylamide-2-methylpropanesulfonic acid, a derivative thereof, or a combination thereof. According to an embodiment, the SAP is a polyacrylamide having crosslinks that are polyethylene glycol diacrylate. In some embodiments, the SAP is polyacrylic acid, wherein the crosslinks are vinyl ester oligomer. In an embodiment, the SAP is poly(acrylic acid) partial sodium salt graft poly(ethylene glycol), which is commercially available from Sigma Aldrich.

The SAP can include a plurality of particles. For fresh aqueous carrier applications, greater than about 85 wt. %, greater than about 90 wt. %, or 100 wt. % of the SAP particles have a size of about 145 microns to about 600 microns. In a specific embodiment, greater than about 50 wt. %, greater than about 70 wt. %, greater than about 85 wt. % of the SAP particles have a size of about 145 microns to about 425 microns. For lower quality aqueous carrier applications, greater than about 85 wt %, greater than about 90 wt. %, or 100 wt. % of the SAP particles have a size of about 145 microns to about 300 microns. The SAP can be sieved to provide particles having the optimal particle size range.

As used herein, "size" refers to the largest linear dimension, e.g., a diameter in a spherical particle. Particles of the SAP are any shape including spherical, angular, and polyhedral.

The SAP is present in a mass concentration from 1 pound of SAP per one thousand gallons of the fracturing fluid (ppt) to 200 ppt, specifically 5 ppt to 100 ppt, and more specifically 15 ppt to 80 ppt. Advantageously, by using SAP having the optimal particle size as disclosed herein, the fracturing fluid can comprise less than about 40 pounds or less than about 30 pounds of the superabsorbent polymer per one thousand gallons of the fracturing fluid for fresh aqueous carrier applications. For lower quality aqueous carrier applications, the fracturing fluid can comprise less than about 60 pounds or less than about 50 pounds of the superabsorbent polymer per one thousand gallons of the fracturing fluid.

The SAP with the optimal particle sizes swell very quickly. In an embodiment, the fracturing fluid has a viscosity of greater than about 250 cps at 23° C. in about 3 to about 5 minutes after the aqueous fluid, the superabsorbent polymer, and the proppant particles are combined. In addition, the fracturing fluid can achieve the maximum viscosity within about 40 minutes or within about 30 minutes after the SAP is combined with the aqueous carrier and the proppant particles.

The SAP with crosslinks is useful as a carrier for a fluid or proppant particles. In a fracturing operation (e.g., hydraulic fracturing), the proppant particles disposed in the SAP remain in the fracture and prop open the fracture when pressure used to form the fracture is released as SAPs are broken in response to the breaking condition. The proppant particles have a size from 1 μm to 2,000 μm, specifically 10 μm to 1,000 μm, more specifically 10 μm to 500 μm, and even more specifically 200 μm to 850 μm. Further, the proppant particles have any shape including spherical, angular, and polyhedral and are monodisperse or polydisperse with an average particle size distribution that is unimodal or multimodal, e.g., bimodal.

The proppant particles include a ceramic, sand, a mineral, a naturally occurring proppant such as a nutshell, a seed shell, or a wood material, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles include cured, partially cured, or uncured coatings of, e.g., a thermoset or thermoplastic resin. Curing the coating on the proppant particles occurs before or after disposal of the proppant particles in the SAP or before or after disposal of the hydraulic fracturing composition downhole, for example.

In addition to the proppant particles and the SAP, the hydraulic fracturing composition includes a breaker in some embodiments. The breaker contacts the SAP to break the SAP. In an embodiment, the breaker contacts the SAP and breaks a bond in the backbone of the polymer chains of the SAP, a bond in the crosslinker, a bond between the crosslinker and a polymer chain of the SAP, or a combination thereof. That is, breaking the SAP includes disintegrating, decomposing, or dissociating the SAP such as by breaking bonds in the backbone of the SAP, breaking crosslinks among chains of the SAP, changing a geometrical conformation of the superabsorbent polymer, or a combination thereof. In this way, the viscosity of the hydraulic fracturing composition decreases. In some embodiments, the breaker breaks the SAP to form a decomposed polymer such as a plurality of fragments that have a lower molecular weight than the SAP. After breaking the SAP, the plurality of proppant particles is released from the SAP.

The breaker includes an oxidizer such as a peroxide, a persulfate, a perphosphate, a perborate, a percarbonate, a persilicate, an oxyacid of a halogen, an oxyanion of halogen, a peracid, a derivative thereof, or a combination thereof.

The breaker is optionally encapsulated in an encapsulating material to prevent the breaker from contacting the SAP. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

The aqueous carrier is an aqueous fluid that includes water, brine, an acid such as a mineral acid or an organic acid, or a base. The brine is, for example, seawater, produced water, completion brine, or a combination thereof. In an exemplary embodiment, the aqueous carrier comprises high quality fresh water. Such an aqueous carrier has a total dissolved solid content of equal to or less than 400 parts per million (ppm) and a hardness of less than 100 parts per million based on calcium carbonate. In another exemplary embodiment, the aqueous carrier comprises low quality water. Such an aqueous carrier has a total dissolved solid content of greater than 400 ppm to less than 6,000 ppm, greater than 1,000 ppm to less than 5,000 ppm, or greater than 2,000 ppm to less than 4,000 ppm. The hardness of a low quality water can be 100 ppm to 2,500 ppm, 250 ppm to 2,000 ppm, or 500 ppm to 1,500 ppm, normally expressed as calcium carbonate.

The fracturing fluid can also contain one or more of the following additives: a scale inhibitor; a tracer; a pH-buffering agent; a lubricant; a clay stabilizer; an acid; a surfactant; a biocide; or a viscous polymer. The hydraulic fracturing fluid can be a liquid or a foam. Exemplary additives and methods to form liquid or foam fracturing fluid are described in US 2014/0332213, US 2014/0332214, and US 2015/0096751.

In the hydraulic fracturing fluid, the proppant particles are present in an amount effective to prop open the fracture without the geometry of the fracture being altered during settling of the formation when the proppant is released from the SAP. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the fluid. In the hydraulic fracturing composition, any ratio of the amount of the proppant particles to the amount of the SAP is applicable as long as the proppant particles are suspended in the gel formed by the SAP.

In an embodiment, the breaker is present in the hydraulic fracturing composition in a mass concentration from 1 ppt to 20 ppt, specifically 1 ppt to 15 ppt, and more specifically, 1 ppt to 10 ppt, based on the total volume of the fluid.

The hydraulic fracturing composition can be made in a variety of ways. According to an embodiment, a process for making the hydraulic fracturing fluid includes contacting a superabsorbent polymer having the optimal particle size as disclosed herein with an aqueous carrier, and proppant particles.

The additive, if present, can be added to the fluid before or after disposing the SAP and the proppant particles. Optionally, the additive is added to the SAP and proppant particles. According to an embodiment, the breaker is added to the fluid before or after disposing the SAP and the proppant particles. Optionally, the breaker is added to the SAP and proppant particles.

In an embodiment, combining the components of the hydraulic fracturing composition is accomplished in a vessel such as a mixer, blender, and the like. In some embodiments, the hydraulic fracturing composition is injected without mixing, e.g. it is injected "on the fly". The components are mixed, agitated, stirred, and the like. In an embodiment, the components are combined as the hydraulic fracturing composition is being disposed downhole.

Example 1 Hydration Rate Testing in Fresh Water

Superabsorbent material A (SAP-A) was sieved into different size ranges. Samples containing particles with sizes in the 20/30, 30/40, 40/50, 50/70, and 70/100 mesh ranges were collected and tested. Each sample (0.12 g) was hydrated in 250 g fresh water under 2000 rpm shearing in a Warring blender for 3 min. The mixtures were then transferred to the cup of Ofite M900 rheometer with R1B2 configuration. Viscosity development as a function of time was recorded. The results were summarized in FIG. 1.

As shown in FIG. 1, the mixture containing SAP-A particles having a size within the range of 20/30 mesh showed the slowest hydration rate, i.e., slowest viscosity development, as the mixture reached an apparent viscosity of about 1750 cps after the SAP-A was mixed with fresh water for about 30 minutes.

Example 2 Proppant Suspension in Fresh Water

Figure 2A:
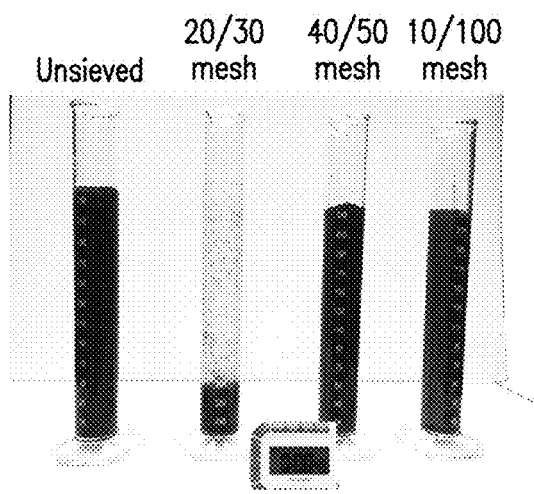
FIG. 2A shows newly prepared compositions containing fresh water, proppants, and a superabsorbent polymer having different particle size ranges.
Figure 2B:
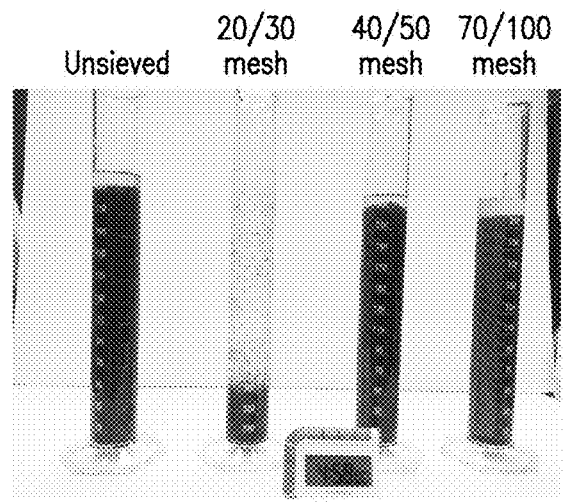
FIG. 2B shows the images of the compositions of FIG. 2A after five hours.

The un-sieved super absorbent material A and sieved 20/30, 40/50, 70/100 mesh portions were tested for proppant suspension. Each SAP-A sample (1.2 g) was hydrated in 250 g fresh water for 3 minutes. Ceramic intermediate strength proppants (60 g) was added; and the resultant was mixed thoroughly for about 30 seconds. The mixed fluids were then transferred to graduated cylinders to record proppant settling level at different time intervals. Pictures taken at time 0 and 5 hours are shown in FIGS. 2A and 2B. Mixtures containing SAP-A particles having a size in the range of 20/30 mesh was found to be ineffective in proppant suspension at 0.48% loading in fresh water.

Example 3 Hydration Rate Test in 2500 ppm TDS and 1000 ppm Hardness Water

Figure 3:
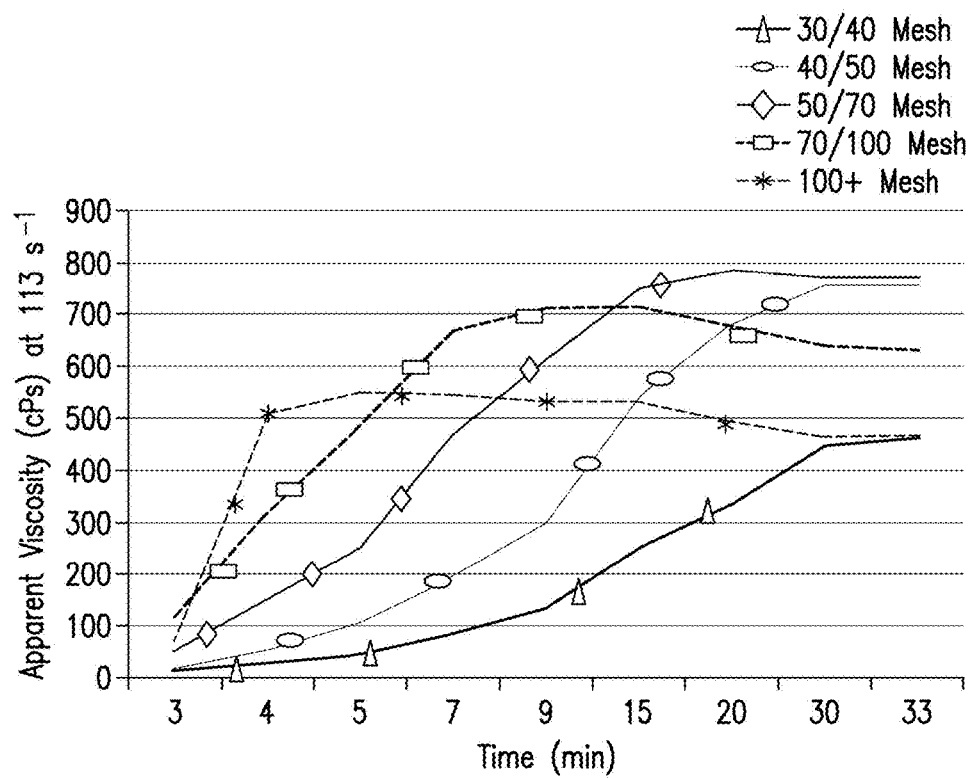
FIG. 3 shows the viscosity changes of compositions containing a superabsorbent polymer having different particle size ranges and water having 2,500 ppm total dissolved solids and 1,000 ppm hardness as calcium carbonate.

SAP polymer B (SAP-B) was sieved into 30/40, 40/50, 50/70, 70/100 and 100+ mesh portions. 0.18 g of each sample, together with 0.12 g additive C, was hydrated in 250 g water having 2,500 ppm TDS and 1,000 ppm total hardness (as $CaCO_3$) under 2000 rpm shearing in a Warring blender for 3 min. The mixtures were transferred to the cup of Ofite M900 rheometer with R1B2 configuration. Viscosity development for each mixture was recorded. The results are summarized in FIG. 3.

The mixture containing SAP-B particles having a size larger than 50 mesh showed significantly slower hydration, i.e., slower viscosity development. The data also indicates that the smallest particle size (100+ mesh portion) does not provide the highest viscosity although the hydration rate is the highest (fastest to reach its peak viscosity).

Example 4 Proppant Suspension Test in 2500 ppm TDS and 1000 ppm Hardness Water

Figure 4A:
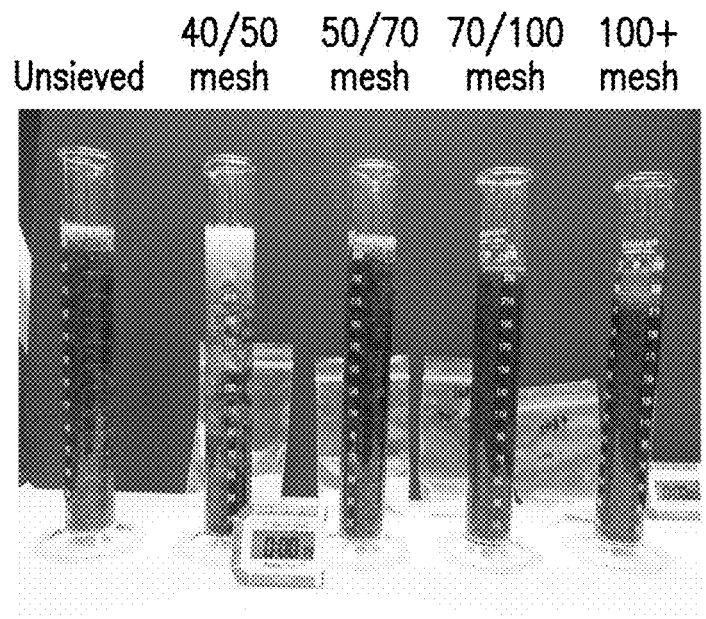
FIG. 4A shows newly prepared compositions containing proppant particles, a superabsorbent polymer having different particle size ranges, and water having 2,500 ppm total dissolved solids and 1,000 ppm hardness as calcium carbonate.
Figure 4B:
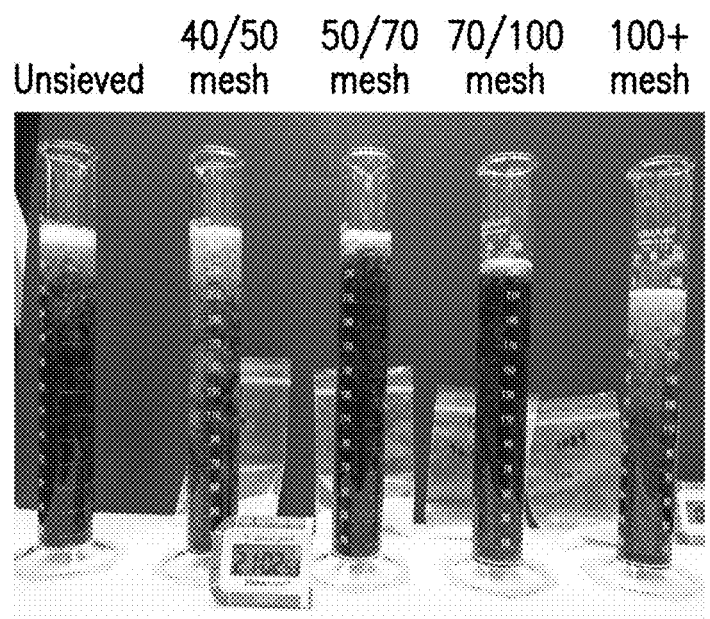
FIG. 4B shows the images of the compositions of FIG. 4A after twenty-one hours.

Sample B and sieved 30/40, 40/50, 50/70, 70/100 and 100+ mesh portions were tested for proppant suspension. 1.8 g of each sample was hydrated in 250 g water having 2500 ppm TDS and 1000 total hardness (as $CaCO_3$) under 2000 rpm shearing in a Warring blender for 3 min, 60 g ISP (ceramic proppant) was added and mixed thoroughly for about 30 seconds. The mixed fluids were then transferred to graduated cylinders to record proppant settling level at different time intervals. Pictures taken at time 0 and 21 hours are shown in FIG. 4. SAP having a size of 50/70 and 70/100 mesh showed the best proppant suspension ability.

Superabsorbent polymers with particle size in the disclosed optimal size range offer the most reliable hydration rate and the capability to handle less than ideal field conditions, e.g., low quality water, low water temperatures, etc.

Further included in this disclosure are the following specific embodiments, which do not necessarily limit the claims.

Embodiment 1

A hydraulic fracturing process comprising:
combining an aqueous carrier with a superabsorbent polymer and a plurality of proppant particles to form a fracturing fluid;
the aqueous carrier having a total dissolved solid content of equal to or less than 400 parts per million and a hardness of less than 100 parts per million as calcium carbonate; and
the superabsorbent polymer comprising particles having a size of about 145 microns to about 600 microns; and
disposing the fracturing fluid in a downhole environment.

Embodiment 2

The process of Embodiment 1, wherein the superabsorbent material comprises particles having a size of about 145 microns to about 425 microns.

Embodiment 3

The process of Embodiment 1 or Embodiment 2, wherein the superabsorbent polymer comprises a repeat unit derived from an acrylate, an acrylamide, a vinylpyrrolidone, a vinyl acetate, a vinyl alcohol, a saccharide, a 2-acrylamide-2-methylpropanesulfonic acid, a derivative thereof, or a combination thereof; and the superabsorbent polymer comprises a plurality of crosslinks.

Embodiment 4

The process of Embodiment 3, wherein the crosslinks of the superabsorbent polymer are formed prior to combining the superabsorbent polymer with the aqueous carrier and the proppant particles.

Embodiment 5

The process of any one of Embodiments 1 to 4, wherein fracturing fluid comprises less than about 40 pounds of the superabsorbent polymer per one thousand gallons of the fracturing fluid.

Embodiment 6

The process of any one of Embodiments 1 to 5, wherein the fracturing fluid has a viscosity of greater than about 250 cps at 23° C. in about 3 to about 5 minutes after the aqueous carrier, the superabsorbent polymer, and the proppant particles are combined.

Embodiment 7

The process of any one of Embodiments 1 to 6, wherein the proppant particles have a size of about 200 microns to about 850 microns.

Embodiment 8

The process of any one of Embodiments 1 to 7, wherein greater than about 85 wt % of the superabsorbent polymer has a particle size of about 145 microns to about 600 microns, based on the total weight of the super absorbent polymer.

Embodiment 9

A hydraulic fracturing process comprising:
combining an aqueous carrier with a superabsorbent polymer and a plurality of proppant particles to form a fracturing fluid;
the aqueous carrier having a total dissolved solid content of greater than 400 parts per million to less than 8,000 parts per million and a hardness of greater than 100 parts per million to less than 2,500 parts per million as calcium carbonate; and
the superabsorbent polymer comprising particles having a size of about 145 microns to about 300 microns; and
disposing the fracturing fluid in a downhole environment.

Embodiment 10

The process of Embodiment 9, wherein the aqueous carrier has a total dissolved solid content of greater than 1,000 parts per million to less than 5,000 parts per million; and a hardness of greater than 250 parts per million to about 2,000 parts per million as calcium carbonate.

Embodiment 11

The process of Embodiment 9 or Embodiment 10, wherein the aqueous carrier has a total dissolved solid content of greater than 2,000 parts per million to less than 4,000 parts per million; and a hardness of greater than 500 parts per million to about 1,500 parts per million as calcium carbonate.

Embodiment 12

The process of any one of Embodiments 9 to 11, wherein the superabsorbent polymer comprises a repeat unit derived from an acrylate, an acrylamide, a vinylpyrrolidone, a vinyl acetate, a vinyl alcohol, a saccharide, a 2-acrylamide-2-methylpropanesulfonic acid, a derivative thereof, or a combination thereof; and the superabsorbent polymer comprises a plurality of crosslinks.

Embodiment 13

The process of any one of Embodiments 9 to 12, wherein fracturing fluid comprises less than about 60 pounds of the superabsorbent polymer per one thousand gallons of the fracturing fluid.

Embodiment 14

The process of any one of Embodiments 9 to 13, wherein the fracturing fluid has a viscosity of greater than about 250 cps at 23° C. in about 3 to about 5 minutes after the aqueous fluid, the superabsorbent polymer, and the proppant particles are combined.

Embodiment 15

The process of any one of Embodiments 9 to 14, wherein the proppant particles have a size of about 200 microns to about 850 microns.

Embodiment 16

The process of any one of Embodiments 9 to 15, wherein greater than about 85 wt % of the super absorbent polymer has a size of about 145 microns to about 300 microns, based on the total weight of the super absorbent polymer.

Embodiment 17

A method of improving the efficiency of a superabsorbent polymer to carry proppants in a fracturing fluid, the method comprising:
providing a superabsorbent polymer, wherein greater than about 85 wt % of the superabsorbent polymer has a particle size of about 145 microns to about 600 microns based on the total weight of the superabsorbent polymer; and
combining the superabsorbent polymer with an aqueous carrier and a plurality of proppant particles;
the aqueous carrier having a total dissolved solid content of equal to or less than 400 parts per million and a hardness of less than 100 parts per million as calcium carbonate.

Embodiment 18

A method of improving the efficiency of a superabsorbent polymer to carry proppants in a fracturing fluid, the method comprising:
providing a superabsorbent polymer, wherein greater than about 85 wt % of the superabsorbent polymer has a particle size of about 145 microns to about 300 microns, based on the total weight of the superabsorbent polymer; and
combining the superabsorbent polymer with an aqueous carrier and a plurality of proppant particles;
the aqueous fluid having a total dissolved solid content of greater than 400 parts per million to less than 8,000 parts per million and a hardness of greater than 100 parts per million to less than 2,500 parts per million as calcium carbonate.

Embodiment 19

A hydraulic fracturing fluid comprising: an aqueous carrier having a total dissolved solid content of equal to or less than 400 parts per million and a hardness of less than 100 parts per million as calcium carbonate; a superabsorbent polymer; wherein greater than about 85 wt % of the superabsorbent polymer has a particle size of about 145 microns to about 600 microns based on the total weight of the superabsorbent polymer; and a plurality of proppant particles.

Embodiment 20

A hydraulic fracturing fluid comprising: an aqueous carrier having a total dissolved solid content of greater than 400 parts per million to less than 8,000 parts per million and a hardness of greater than 100 parts per million to less than 2,500 parts per million as calcium carbonate; a superabsorbent polymer; wherein greater than about 85% of the superabsorbent polymer has a particle size of about 145 microns to about 300 microns based on the total weight of the superabsorbent polymer; and a plurality of proppant particles.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. As used herein, "combination" is inclusive of blends, mixtures, alloys, reaction products, and the like. Further As used herein, "a combination thereof" refers to a combination comprising at least one of the named constituents, components, compounds, or elements, optionally together with one or more like constituents, components, compounds, or elements not named. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or."

The modifier "about" used in connection with a quantity is inclusive of the stated value and has the meaning dictated by the context (e.g., it includes the degree of error associated with measurement of the particular quantity). All references are incorporated herein by reference in their entirety.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

The invention claimed is:
1. A hydraulic fracturing process comprising:
combining an aqueous carrier with a superabsorbent polymer and a plurality of proppant particles to form a fracturing fluid; and
disposing the fracturing fluid in a downhole environment, wherein one of the following conditions apply:
(i) the aqueous carrier has a total dissolved solid content of equal to or less than 400 parts per million and a hardness of less than 100 parts per million expressed as equivalent of calcium carbonate, and greater than about 85 wt % of the superabsorbent polymer has a particle size of about 145 microns to about 600 microns, based on the total weight of the superabsorbent polymer; or
(ii) the aqueous carrier has a total dissolved solid content of greater than 400 parts per million to less than 8,000 parts per million and a hardness of greater than 100 parts per million to less than 2,500 parts per million expressed as equivalent of calcium carbonate, and greater than about 85 wt % of the superabsorbent polymer comprises particles having a size of about 145 microns to about 300 microns.

2. The process of claim 1, wherein the aqueous carrier has a total dissolved solid content of equal to or less than 400 parts per million and a hardness of less than 100 parts per million expressed as equivalent of calcium carbonate; and greater than about 85 wt % of the superabsorbent polymer has a particle size of about 145 microns to about 600 microns.

3. The process of claim 2, wherein greater than about 50 wt % of the superabsorbent material has a particle size of about 145 microns to about 425 microns.

4. The process of claim 1, wherein the superabsorbent polymer comprises a repeat unit derived from an acrylate, an acrylic acid, a salt of an acrylic acid, an acrylamide, a vinylpyrrolidone, a vinyl acetate, a vinyl alcohol, a saccharide, a 2-acrylamide-2-methylpropanesulfonic acid, a derivative thereof, or a combination thereof; and the superabsorbent polymer comprises a plurality of crosslinks.

5. The process of claim 4, wherein the crosslinks of the superabsorbent polymer are formed prior to combining the superabsorbent polymer with the aqueous carrier and the proppant particles.

6. The process of claim 2, wherein fracturing fluid comprises less than about 40 pounds of the superabsorbent polymer per one thousand gallons of the fracturing fluid.

7. The process of claim 1, wherein the fracturing fluid has a viscosity of greater than about 250 cps at 23° C. in about 3 to about 5 minutes after the aqueous carrier, the superabsorbent polymer, and the proppant particles are combined.

8. The process of claim 1, wherein the proppant particles have a size of about 200 microns to about 850 microns.

9. The process of claim 2, wherein greater than about 90 wt % of the superabsorbent polymer has a particle size of about 145 microns to about 600 microns, based on the total weight of the super absorbent polymer.

10. The process of claim 1, wherein the aqueous carrier has a total dissolved solid content of greater than 400 parts per million to less than 8,000 parts per million and a hardness of greater than 100 parts per million to less than 2,500 parts per million as calcium carbonate; and greater than about 85 wt % of the superabsorbent polymer comprises particles having a size of about 145 microns to about 300 microns.

11. The process of claim 10, wherein the aqueous carrier has
a total dissolved solid content of greater than 1,000 parts per million to less than 5,000 parts per million; and
a hardness of greater than 250 parts per million to about 2,000 parts per million as calcium carbonate.

12. The process of claim 10, wherein the aqueous carrier has
a total dissolved solid content of greater than 2,000 parts per million to less than 4,000 parts per million; and
a hardness of greater than 500 parts per million to about 1,500 parts per million as calcium carbonate.

13. The process of claim 10, wherein the superabsorbent polymer comprises a repeat unit derived from an acrylate, an acrylic acid, a salt of an acrylic acid, an acrylamide, a vinylpyrrolidone, a vinyl acetate, a vinyl alcohol, a saccharide, a 2-acrylamide-2-methylpropanesulfonic acid, a derivative thereof, or a combination thereof; and the superabsorbent polymer comprises a plurality of crosslinks.

14. The process of claim 13, wherein the crosslinks of the superabsorbent polymer are formed prior to combining the superabsorbent polymer with the aqueous carrier and the proppant particles.

15. The process of claim 10, wherein fracturing fluid comprises less than about 60 pounds of the superabsorbent polymer per one thousand gallons of the fracturing fluid.

16. The process of claim 10, wherein greater than about 90 wt % of the super absorbent polymer has a size of about 145 microns to about 300 microns, based on the total weight of the super absorbent polymer.

17. The method of claim 2, wherein greater than about 75 wt % of the superabsorbent material has a particle size of about 145 microns to about 425 microns, based on the total weight of the superabsorbent polymer.

* * * * *